United States Patent [19]

Corbin

[11] 4,385,860
[45] May 31, 1983

[54] FORK LIFT ATTACHMENT

[76] Inventor: Richard W. Corbin, 1538 Dover Rd., Mohegan Lake, N.Y. 10547

[21] Appl. No.: 224,602

[22] Filed: Jan. 12, 1981

[51] Int. Cl.³ ............................................ B65G 65/23
[52] U.S. Cl. .................................. 414/420; 414/421; 414/424; 414/607
[58] Field of Search ............... 414/403, 404, 422, 424, 414/607, 608, 622, 639, 643, 645–647, 785, 420, 421, 645, 647, 652–656

[56] References Cited

U.S. PATENT DOCUMENTS

| 1,569,501 | 1/1926 | Kinney | 414/654 |
|---|---|---|---|
| 1,841,253 | 1/1932 | Persinger | 414/420 X |
| 2,304,649 | 12/1942 | McDaniels | 414/420 |
| 3,270,900 | 9/1966 | Sherman | 414/607 X |
| 4,243,354 | 1/1981 | Garcia | 414/607 |

Primary Examiner—Robert G. Sheridan
Attorney, Agent, or Firm—Wolder, Gross & Yavner

[57] ABSTRACT

A barrel handling and dumping device for use with a fork lift truck comprises a barrel support plate and a pair of laterally spaced rearwardly extending bracket arms hinged to their front edges to the underface of the support plate and overlying the fork tongues and anchored thereto by pairs of longitudinally spaced collars affixed to the underfaces of the bracket arms and slidably engaging the torques, the arms being locked in position by set screws. Front and rear chains attached to the support plate carry hooks engaging the barrel rim, one of the chains having a chain tightener toggle member and an upwardly propelling stop member is located at the support plate front border, actuating arm projects forwardly medially from the support plate. To dump a barrel carried by the support plate the truck is advanced to bring the actuating arm beneath a rearwardly projecting tripping projection on the upper part of a receiver, and the fork raised to bring the actuating member into enagement with the trip and then advanced and raised to invert the barrel.

10 Claims, 10 Drawing Figures

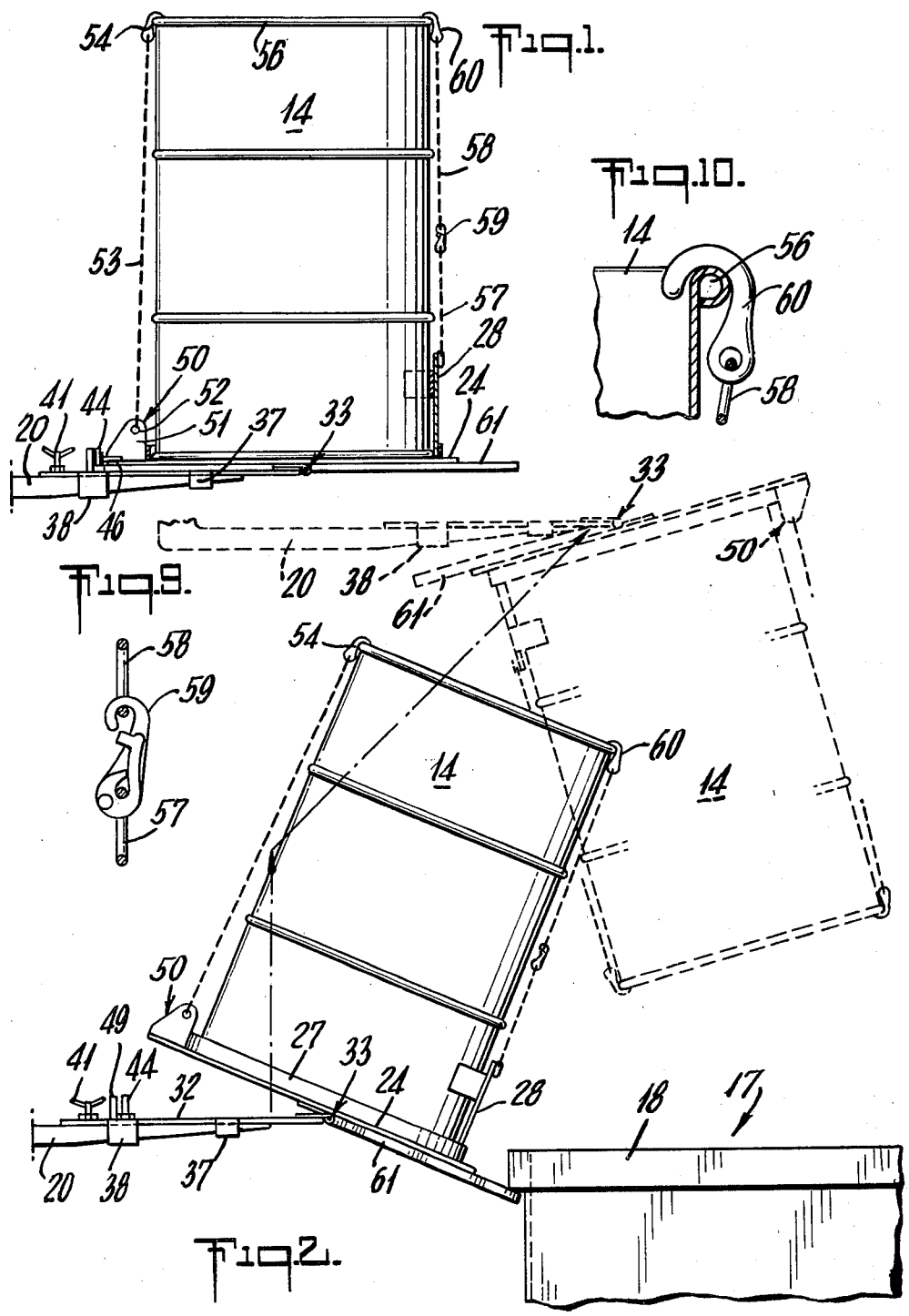

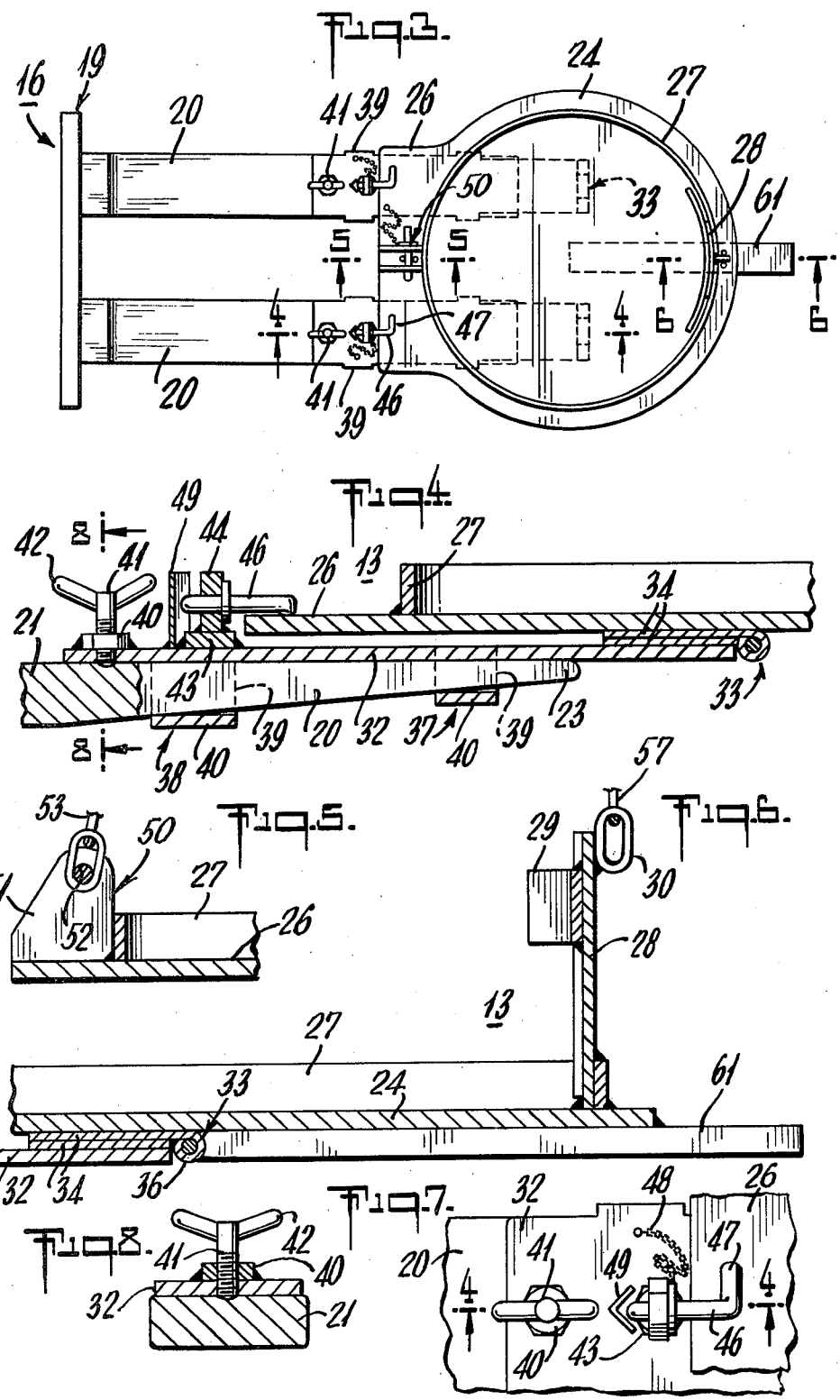

FORK LIFT ATTACHMENT

BACKGROUND OF THE INVENTION

The present invention relates generally to improvements in receptacle handling and emptying equipment and it relates more particularly to an improved device for attachment to a fork lift truck for conveying and dumping the contents of a conveyer.

In many industrial and commercial areas where fork lift trucks are employed, the gathering and disposal of waste originating throughout the area is a common problem. The conventional practice is to dispose open topped waste receptacles such as barrels, drums or the like, throughout the area and collect the waste in these waste receptacles, which are then transported to a disposal area and emptied into a conventional receiver container having a top opening and a disposal truck periodically lifts and empties the container into the disposal truck. This procedure is difficult, awkward and highly time and labor consuming. Various mechanisms have heretofore been proposed for use with conveyer trucks of the fork lift type for facilitating the handling and emptying of the waste receptacles. However, the aforesaid waste receptacle handling and emptying mechanisms possess many drawbacks and disadvantages. They are complicated and expensive devices, difficult and awkward to apply and operate, are of little versatility and adaptability and otherwise leave much to be desired.

SUMMARY OF THE INVENTION

It is a principal object of the present invention to provide an improved device for handling transporting and emptying receptacles.

Another object of the present invention is to provide an improved receptacle handling and emptying device for attachment to a fork lift truck.

Still another object of the present invention is to provide an improved device of the above nature characterized by its reliability, ruggedness, simplicity, low cost, ease of operation and application and great versatility and adaptability.

The above and other objects of the present invention will become apparent from a reading of the following description taken in conjunction with the accompanying drawings which illustrate a preferred embodiment thereof.

The receptacle handling and dumping device in accordance with the present invention is used with a lift truck including a forwardly projecting, vertically movable lift member and a receiver container with a top opening and a rearwardly extending upper projection defining a trip, the device comprising a coupling bracket releasably connected to and projecting at least to the front end of the lift, a receptacle supporting tilt member connected to the front portion of the bracket member for swinging about a transverse axis between a retracted upright position and an advanced inverted position, an actuating member positioned at the forward end of the tilt member and means for releasably anchoring to the tilt member an upright receptacle, whereby upon movement of the lift truck to bring the actuating member to a position underlying the trip and raising the lift member, the resulting raising of the actuating member is restricted to swing the tilt member forwardly about a transverse axis and invert the receptacle.

In its preferred form the improved device is used with a fork lift truck in which the lift includes a pair of prongs and the bracket includes a pair of transversely spaced arms overlying the respective left prongs and provided with depending collars slideably tightly engaging the prongs, the arms being releasably locked in position by set screws. The tilt member is a plate hinged at its underface to the forward ends of the bracket arms and the actuating member is an elongated finger medially forwardly projecting from the tilt plate. A socket defining peripheral upright wall is located atop the tilt plate and an upright terminating at its top with laterally projecting wings is located at the front medial portion of the peripheral wall. A pair of chain cables are anchored to the medial front and medial rear of the tilt plate and each cable carries a hook at its free end which releasably engages the upper rim of the tilt plate supported receptacle. The front chain cable includes a toggle type chain tightening member between the ends of the cable. Separable lock pins separably engage bored members on the bracket arms and overlie the tilt plate to releasably lock it in its retracted position.

The improved receptacle handling and dumping device is highly reliable, simple, rugged and inexpensive, easy and convenient to apply and operate, and is of great versatility and adaptability.

BRIEF DESCRIPTION OF THE DRAWINGS

FIG. 1 is a front elevational view of a preferred embodiment of the present invention showing the improved device carrying a receptacle in upright position and attached to a fork lift truck;

FIG. 2 is a view similar to, but showing by full line, the receptacle in a partially tilted position and by broken line in fully inverted position dumping into a receiver container;

FIG. 3 is a top plan view of the device in the condition shown in FIG. 1;

FIG. 4 is an enlarged sectional view taken along line 4—4 in FIG. 3;

FIG. 5 is an enlarged sectional view taken along line 5—5 in FIG. 3;

FIG. 6 is an enlarged sectional view taken along line 6—6 in FIG. 3;

FIG. 7 is an enlarged fragmentary top plan view of a portion of the improved device;

FIG. 8 is a fragmentary enlarged sectional view taken along line 8—8 in FIG. 7;

FIG. 9 is a fragmentary front elevational view of the front receptacle anchoring chain showing the chain tightening toggle in closed condition; and FIG. 10 is an enlarged longitudinal sectional view of the front upper rim of the supported receptacle and showing the rim engaging front cable carried hook.

DESCRIPTION OF THE PREFERRED EMBODIMENT

Referring now to the drawings which illustrate a preferred embodiment of the present invention, the reference numeral 13 generally designating the improved receptacle handling and dumping device which is illustrated as handling an open topped receptacle 14, for example, a cylindrical metal drum and as being employed with a conventional fork lift truck 16 and a receiver container 17. The container 17 is of generally known construction and is of rectangular configuration and provided with the top opening delineated by a top peripheral rim 18 projecting outwardly from the top borders of the container walls and integrally formed with and reinforcing the container and defining a trip as will be hereinafter explained. It should be understood that other receiver structures may be employed provided that an outwardly projecting trip located proximate its upper border and opening.

The fork lift truck 16 comprises a motor vehicle mounted vertically moveable lift member 19 which is controllably motor driven between raised and lowered positions and includes a pair of transversely spaced longitudinally forwardly projecting parallel cantilevered similar cleats or prongs 20. The prongs 20 include flat coplaner horizontal top faces 21 and at their outer portions coplanar inclined underfaces 22 which converge with the top faces 21 at a rounded front apices 23.

The improved receptacle handling and dumping device 13 includes a flat receptacle support or tilt plate 24 preferably of substantially circular or high polygonal configuration and having a medially rearwardly projectively rectangular section 26 of a width preferably somewhat greater than the distance between the outer longitudinal edges of prongs 20. A socket defining low upstanding annular wall 27 is concentric with and shortly inwardly of the periphery of the tilt plate 24 and is welded or otherwise affixed to the top face thereof.

Medially positioned on the medial front inside face of annular wall 27 and welded thereto and to tilt plate 24 is a vertically extending upright post 28 of the arcuate transverse cross section and a receptacle stop or bumper wing member 29 also of arcuate transverse cross section is welded at its medial portion to the upper inside face of post 28 and extends laterally outwardly therefrom. Welded to the medial front upper face of post 28 is a chain coupling loop 30 which may be the bottom link of a receptacle anchoring chain as will be hereinafter described.

Hinged at their front ends to the underface of tilt plate 24 forward of the transverse medial axis of the tilt plate 24 are a pair of rearwardly extending arms 32 which are swingable about a common transverse axis forward of the aforesaid transverse medial axis. Each of the arms 32 is hinged to the tilt plate 26 by a hinge member 33 including a pair of hinge plates 34 terminating at their fronts in interdigitating hinge knuckles 36 engaging a transverse pivot pin, the upper hinge plate 34 being affixed to the underface of tilt plate 24 and lower hinge plate 34 being affixed to the top face of arm 32 with the knuckles 36 being along and adjacent to the front end of the arm 32.

A pair of longitudinally spaced front and rear coupling collars 37 and 38 depend from each of the arms 32 and separably tightly slideably engage a respective lift prong 20, the front collar 37 being shallower than the rear collar 38 in accordance with the corresponding difference in depth of the prong 20 at their position of tight collar engagement. Each of the collars 37, 38 is rectangular and includes a pair of vertical parallel side legs 39 depending from the side edges of and integrally formed with the arm 32 and joined at their bottoms by a horizontal cross arm which tightly engages the underface of prong 20 when the device 13 is in its attached operative position. In order to releasably lock each of the arms 32 in applied overlying position of a corresponding prong 20 a medial opening is formed in the rear portion of the arm and a nut is welded to the top face of the arm with its threaded bore registering with the opening. A set screw 41 with finger engageable wings 42 engages the nut 40 and when tightened, tightly engages the prong top face 21 to releaseably retain the coupling arms 32 in its applied operative position.

In order to facilitate the handling of device 10 and its application and removal from the lift fork, means are provided for releasably locking the arms 32 to the tilt plate to prevent their relative rotation. Such locking means includes a base block 43 welded medially atop each coupling arm 32 shortly rearwardly of the rear edge of the retracted tilt plate section 26 and an upstanding vertical block 44 welded atop base block 43 and provided with a longitudinal bore. A locking pin 46 terminating at its rear in a bent leg 47 separably slideably engages the bore in block 44 with the forwardly projecting section of pin 46 overlying tilt plate section 26 to prevent the swinging of tilt plate 24. The lock pin 46 is connected to arm 32 by an elongated chain 48, a stop ring is affixed to pin 46 to limit its rearward movement and an upstanding angle member 49 is affixed to the top face of arm 32 rearwardly of block 43 to prevent the insertion of pin 46 into the bore in block 44 through its rear.

An arrangement is provided for releasably anchoring a receptacle 14 in an upright condition on the tilt plate 26 in engagement with the socket defined by annular wall 17, such arrangement including a chain coupling bracket 50 medially affixed to plate section 26 immediately rearwardly of annular wall 27. Bracket 50 includes a pair of transversely spaced parallel vertical plates 51 having aligned bores engaging and supporting between them a transverse coupling pin 52. A rear cable defining chain 53 has a bottom link engaged by coupling pin 52 and has a hook member 54 attached to its free end and releasably engaging the top beaded rim 56 of receptacle 14. A front lower chain section 57 has its bottom link welded to the upper part of post 28 or otherwise coupled thereto, as described earlier, and the upper end of chain section 57 is connected to the lower end of an upper chain section 58 by means of a chain tightening toggle coupling member 59. The upper chain section 58 carries at its upper end a second hook member 60 which releasably engages the forward portion of the receptacle beaded rim 56.

A trip engageable actuating finger 61 projects medially forwardly from the front of tilt plate 24 and is defined by the front projecting end of an elongated bar medially welded to the underface of tilt plate 24 and extending beyond the tilt plate front edge.

In applying the device 10 to the fork lift 19 the tilt plate 24 and coupling arms 32 are locked against relative rotation by the insertion of pins 46 into blocks 44 and the coupling arms 32 are slid rearwardly over prongs 41 from the fronts thereof with collars 38 and 37 successively engaging the prongs until the collars tightly encircle and engage the respective prongs. The set screws 41 are then tightened and the pins 46 removed to release the tilt plate 24 and permit its rotation.

Considering now the operation of the device 10, the fork lift truck with the attached device 10 is driven to the position alongside a filled open topped receptacle 14 and the receptacle 14 is sidled into engagement with the socket defined by annular wall 27 and with bumper plate 29. The rear hook 54 is hooked over the rear of receptacle rim 56 and the front hook 60, with toggle member 59 in its extended open condition is hooked over the front of receptacle rim 56 and the toggle then closed to contract the front chain assembly and tighten the hook to the rim. The receptacle 14 is thus tightly anchored to tilt plate 24.

The fork lift truck is then driven to receiver container 17 with the actuating finger 61 in underlying vertical alignment with the trip defining rim 18 and preferably out of engagement with the wall of the container. The fork lift is then raised to bring the finger 61 into engagement with the underface of trip 18 and is then further raised to impart a clockwise torque (as viewed in FIG. 2) to tilt plate 26 by the downward force on finger 61 by trip 18 whereby to swing the tilt plate 24 and the receptacle 14 into inverted positions dumping the contents of the receptacle 14 into container 17. During the raising of the fork lift 19 the lift truck may be advanced to keep the actuating finger in engagement with the tilt member 18, and with the inversion of the receptacle to effect the disengagement of the trip, the fork lift may be further raised and advanced, if desired, to bring the receptacle 14 to a more forward position.

The receptacle 14 and tilt plate 24 are then returned to their retracted normal positions by lowering the fork lift and controlling the lift truck so that the top of rim 18 bears on the wall of the lowering receptacle 14 to swing it and tilt plate 24 counter-clockwise until the receptacle 14 is upright. The lift truck is then driven to another receptacle which is released from hooks 54 and 56 and replaced by a filled receptacle and handled in the manner described above. It should be noted that the filled upright receptacle is stable on the tilt plate since its center of gravity is rearwardly of the tilt plate swinging axis.

While there has been described and illustrated a preferred embodiment of the present invention, it is apparent that numerous alterations, omissions and additions may be made without departing from the spirit thereof.

What is claimed is:

1. A receptacle handling and dumping device for use with a fork lift truck including a motor driven vertically movable longitudinally forwardly projecting lift member and a receiver container having a top opening and an outwardly projecting trip defining upper member, said device comprising:

coupling means releasably engaging said lift member and extending at least to the forward end of said lift member;

a receptacle supporting tilt member positioned above and connected to the forward portion of said coupling means for swinging about a transverse axis between a retracted upright and an inverted position;

an actuating member positioned at the forward end of said tilt member and movable therewith; and means for releasably anchoring to said tilt member an upright receptacle located thereon, such that the center of gravity of said receptacle is rearwardly displaced from said transverse axis, whereby upon the movement of said lift truck to bring said actuating member to a position underlying said trip and the raising of said lift member, the rising of said actuating member is restricted to thereby swing said tilt member forwardly about said transverse axis so that the center of gravity of said receptacle moves forwardly of said transverse axis such that said receptacle pivots about said transverse axis and freely rotates to an inverted position below said lift member.

2. The device of claim 1 wherein said lift member comprises a forwardly projecting fork including a pair of transversely spaced forwardly projecting prongs and said bracket comprises a pair of correspondingly transversely spaced arms superimposed on and projecting forwardly of said prongs, and hinged at their forward ends to the underface of said tilt member.

3. The device of claim 2 wherein each of said bracket arms includes a pair of longitudinally spaced depending collars tightly slideably engaging a respective prong.

4. The device of claim 3 including means for releasing locking each of said bracket arms against longitudinal movement along a respective prong.

5. The device of claim 1 including means for releasably locking said tilt member in its retracted position.

6. The device of claim 1 wherein said tilt member comprises a receptacle supporting plate and said actuating member comprises a finger member projecting longitudinally medially forwardly from said plate.

7. The device of claim 6 comprising an upright receptacle locating peripheral wall positioned on the top face of said tilt member plate.

8. The device of claim 6 comprising means for limiting the forward movement of said receptacle along said tilt member plate including an upright projecting upwardly from the forward portion of said plate and transversely extending receptacle engaging wings affixed to the upper part of said upright.

9. The device of claim 1 wherein said anchoring means comprises a pair of anchoring cables anchored at their lower ends to front and rear positions on said tilt member plate and hooks affixed to the upper ends of said cables and releasably engaging the rim of said receptacle.

10. The device of claim 9 including a toggle member connected to at least one of said cables between the ends thereof for contracting said cable to a tightened condition and releasably locking the cable in said tightened condition.

* * * * *